G. F. HATCH.
TRAP NEST.
APPLICATION FILED MAR. 17, 1915.
1,198,543.
Patented Sept. 19, 1916.
2 SHEETS—SHEET 1.
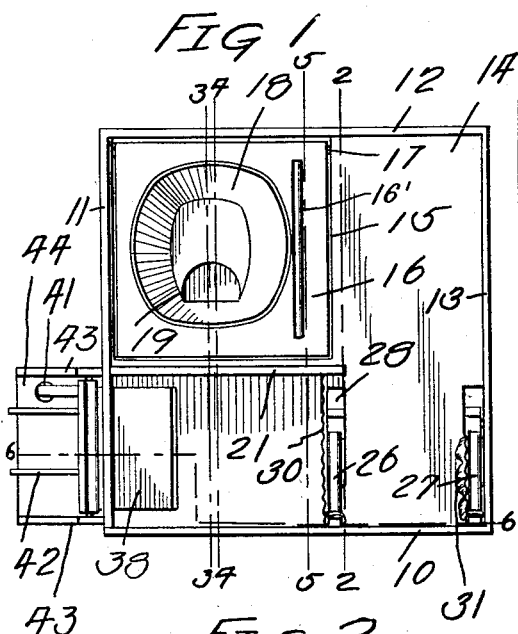
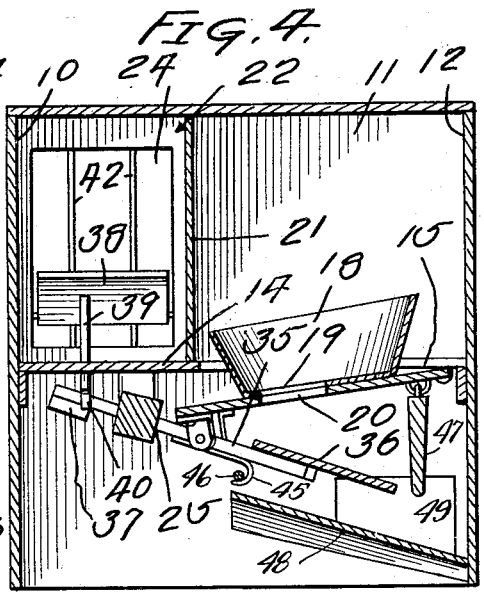
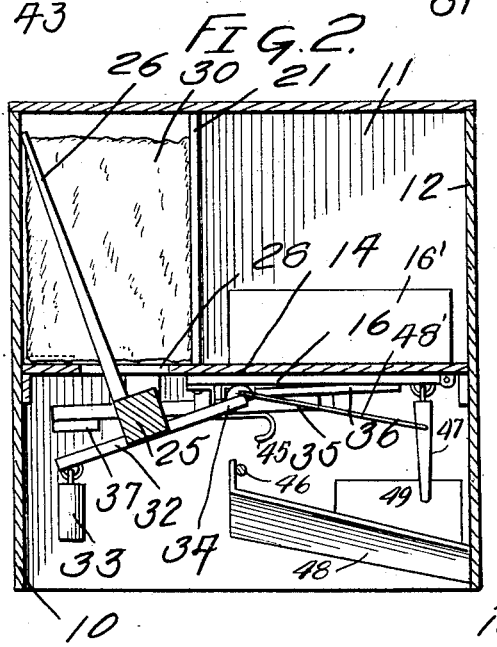
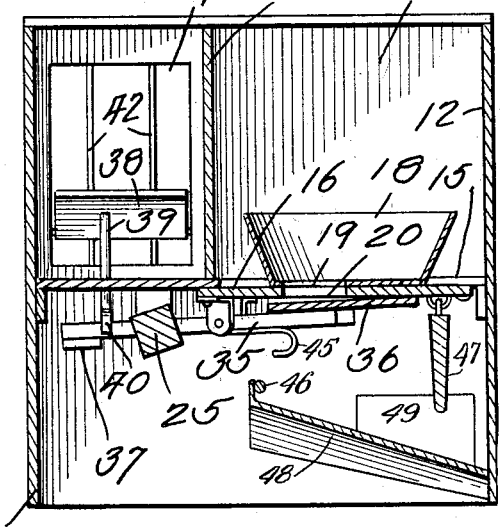
Inventor
G. F. Hatch
Witnesses

G. F. HATCH.
TRAP NEST.
APPLICATION FILED MAR. 17, 1915.

1,198,543.

Patented Sept. 19, 1916.
2 SHEETS—SHEET 2.

Witnesses

Inventor
G. F. Hatch

UNITED STATES PATENT OFFICE.

GEORGE F. HATCH, OF RATHDRUM, IDAHO.

TRAP-NEST.

1,198,543.  Specification of Letters Patent.  Patented Sept. 19, 1916.

Application filed March 17, 1915. Serial No. 14,972.

*To all whom it may concern:*

Be it known that I, GEORGE F. HATCH, a citizen of the United States, residing at Rathdrum, in the county of Kootenai, State of Idaho, have invented certain new and useful Improvements in Trap-Nests; and I do hereby declare the following to be a full, clear, and exact description of the invention, such as will enable others skilled in the art to which it appertains to make and use the same.

This invention relates to improvements in trap nests.

One object of the invention is to provide a trap nest having an entrance opening and an exit opening and means controlled by a tilting nest for opening and closing the entrance and exit.

Another object is to provide a trap nest having entrance and exit openings provided with closures which are arranged to be alternately opened and closed by a tilting nest and an egg operated device.

A further object is to provide a trap nest into which a hen enters by one opening which is closed when the hen sets in the nest and remains closed if the hen lays an egg, which will open when the hen steps from the nest, if she does not lay an egg.

Other objects and advantages will be apparent from the following description when taken in connection with the accompanying drawing.

Figure 5:
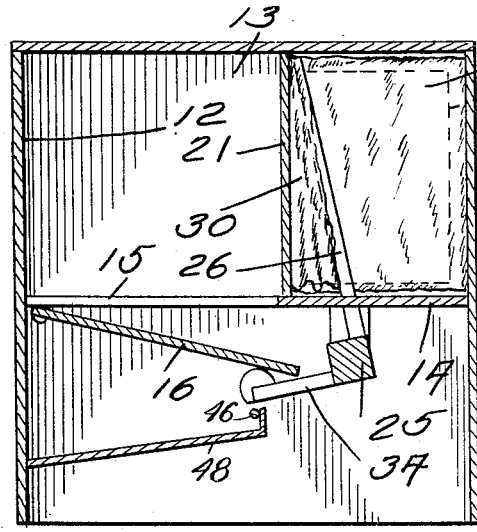
Figure 7:
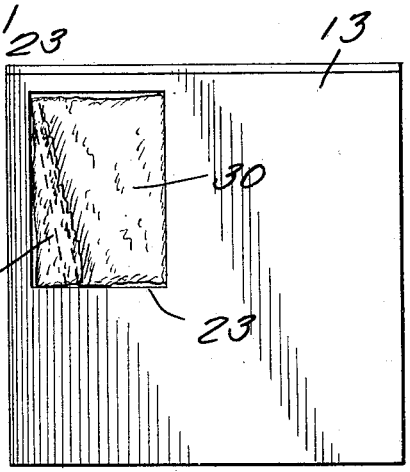
Figure 6:
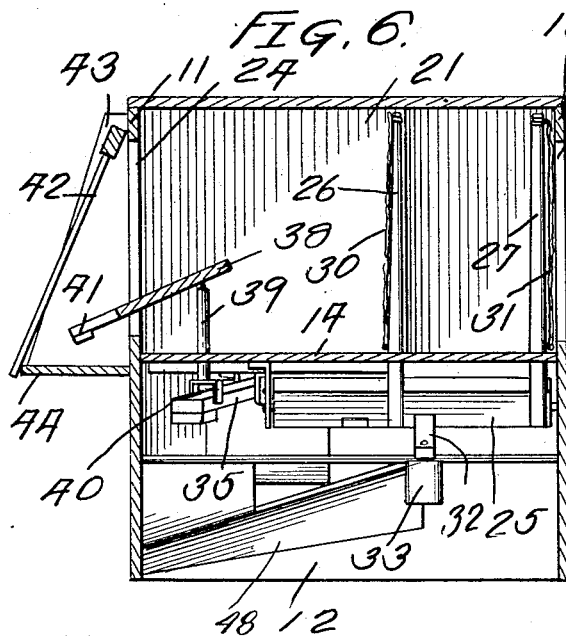
Figure 8:
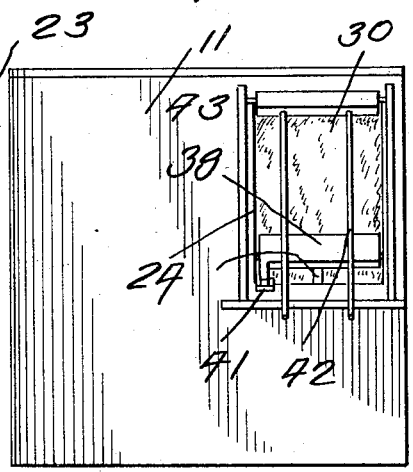

In the drawing: Figure 1 is a top plan view of a nest made in accordance with my invention, with the cover removed, Fig. 2 is a transverse section on the line 2—2 of Fig. 1, Fig. 3 is a transverse section on the line 3—3 of Fig. 1, the parts being shown in normal position, Fig. 4 is a transverse section on the line 4—4 of Fig. 1, showing the position of the parts after an egg has been laid and passed from the nest, Fig. 5 is a section on the line 5—5 of Fig. 1, the parts being in the position of Fig. 4, and Fig. 6 is a section on the line 6—6 of Fig. 1. Fig. 7 is an end view of the nest looking from the entrance opening. Fig. 8 is an end view looking from the exit opening.

Referring particularly to the accompanying drawing, there is shown a box including the side walls 10 and 12 and the end walls 11 and 13. A floor 14 is disposed a suitable distance above the bottom of the box and formed in this floor at one corner of the box is a large opening 15. Disposed in this opening is a tilting platform 16, the same being pivotally connected to the wall 12 and to the adjacent portion of the floor 14 by means of a pivot rod 17. On this tilting platform is a nest 18 in one end of which is formed an egg discharge opening 19, this opening registering with a similar opening 20 in the tilting platform. On one side of the platform 16 is a vertical wall or partition 16′ which serves as a shield or screen for the hen in the nest. Running longitudinally of the box and disposed over the free end of the platform 16 is a vertical partition wall 21 forming a passage-way 22 between said partition and the wall 10. The inner end of the partition wall is disposed a proper distance from the wall 13 so as to permit ready passage from the entrance opening 23 to the nest. At the other end of the passage-way 22 and in the wall 11 is formed an exit opening 24. Mounted on the underside of the floor, and running longitudinally from the opening 23 to the opening 24 is a shaft 25 to which are secured two vertically extending arms 26 and 27, said arms extending through openings 28 and 29 respectively formed in the floor adjacent the inner end of the wall 21 and the entrance opening 23. Secured to the arm 26 and to the inner end of the wall 21 is a flexible door 30.

Secured to the arm 27 and to the corner of the box at which the walls 10 and 13 meet is a flexible door 31. It will thus be seen that when the shaft is rocked in one direction the flexible door 30 will be drawn across the inner end of the passage-way 22 while the door 31 will be collapsed and permit free entrance through the opening 23. Rocking of the shaft in the opposite direction spreads the door 31 across the opening 23 and collapses the door 30. A radially extending arm 32 is carried by the shaft 25 and on its outer end has a weight 33, this weighted arm normally rocking the shaft to open the entrance 23 and close the inner end of the passage 22. A radially extending arm 34 extends from the opposite side of the shaft 25 and under the free end of the tilting platform 16 so that when a hen steps into the nest the weight will depress the platform and by its engagement with the arm 34 rock the shaft 25 and close the opening 23 and open the inner end of the passage 22.

Pivotally mounted on the underside of the free end of the platform 16 is a lever 35, the inner end of which carries a plate 36 which is normally held against the underside of the platform to close the opening 20 by the depression of the other end of the lever which carries a weight 37.

Carried intermediately of the ends of the rock lever 35 is a hook 45 which is adapted to engage with a transverse rod 46 when said lever is depressed by an egg. This will hold the platform 16 in depressed position until the hen steps on the platform 38 on her way out of the trap. The depression of the platform 38 releases the hook from the rod 46 and permits the lever to swing up into normal position and consequently the platform 16 to assume its normal position. Depending from the pivotal side of the platform 16 is a swinging buffer plate 47 against which the egg strikes before dropping on the inclined platform 48. A link 48' is pivotally connected to the buffer plate 47 and to the arm 34. This holds the egg from dropping onto the platform 48 until the hen steps on the platform 38 and releases the arm 34. The upward movement of the arm pushes the buffer plate and permits the egg to fall. A door 49 at one side of the trap permits the ready extraction of the eggs.

Pivotally mounted in the exit opening 24 is an inwardly extending ledge or platform 38 to the inner end of which is connected a pin 39 which extends down through the floor and has its lower end provided with an inverted U-shaped member 40 which straddles the weighted end of the lever 35. This platform 38 is provided with a counterbalancing weight 41, but if desired, a spring can be substituted without departing from the spirit of the invention.

Mounted outside of the opening 24 is a swinging guard 42, the same opening outwardly so that the hen can push the same and escape from the trap, the guard swinging back into position by gravity. Stationary guards 43 are disposed on opposite sides of the opening 24, the lower ends of which carry a stationary platform 44.

In normal condition, the parts are as shown in Fig. 1, in which the curtain 31 is drawn back to permit the entrance through the opening 23, and the curtain 30 drawn across the passage to prevent entrance thereinto. A hen enters through the opening 23, turns to the right and steps into the nest 18. Her weight depresses the nest which actuates the curtains 30 and 31 to swing the former into open position and the latter into closed position. This is accomplished by the rocking of the shaft 25 due to the engagement of the forward or free end of the nest platform with the adjacent end of the arm 34. The arm 35 remains elevated so that the plate 36 is disposed directly below the opening 19. When an egg is laid, it will swing downwardly the arm 35 by its weight contacting with the plate 36. The said arms 34 and 35 are in such position that when the arm 35 is depressed its hook 45 will swing into engagement with the bar 46, thus holding the nest platform in depressed position. When the hen steps off the nest, her only means of exit is through the opening 28, the curtain 31 being in such position that the opening 23 is closed. The hen passes the door or curtain 30, and upon stepping on the platform 38 the vertical rod 39 will be pushed down so as to engage the arm 35 and rock it out of engagement with the bar 46. The weight 33 then rocks the shaft 25 so that the arm 34 engages with the adjacent end of the nest platform 16, raising the same to normal position. The hen can then easily push open the door or guard 45 and pass entirely from the trap nest. The rocking movement of the shaft 25 into normal position, under the influence of the weight 33 restores the curtains 30 and 31 to normal positions as before mentioned.

What is claimed is:

1. A trap nest comprising an inclosure having a passageway extending therethrough and a compartment communicating with the passageway adjacent one end thereof, a tilting nest in the compartment, a normally open door at one end of the passageway, normally closed doors respectively at the other end of the passageway and intermediate the ends thereof, means actuated by the nest when depressed for closing the first door and opening the intermediate door, egg actuated means for holding the nest depressed, and means actuated by the weight of the departing hen for releasing the nest and restoring the parts to normal position.

2. A trap nest comprising an inclosure, a tilting nest mounted in the inclosure, an entrance door, an exit door, means operable by the tilting nest for closing the entrance door and opening the exit door, means operable by an egg deposited in the nest for holding the entrance door closed and the exit door opened, and means at the exit for releasing said holding means to permit the doors and nest to return to normal position.

3. A trap nest comprising an inclosure, a tilting nest having an egg discharge opening, a rock shaft, a transverse arm carried by the shaft in position to be depressed by the nest to rock the shaft, vertically extending arms carried by the rock shaft, entrance and exit doors connected to the arms and to the inclosure, a pivoted egg actuated lever mounted on the tilting nest, a transverse bar mounted in the inclosure below the nest, a hook carried by the egg actuated lever for engagement with the bar to hold the nest in depressed position and the shaft in rocked position, and a depressible platform actuated by the departing hen for releasing the hook from the rod to permit the parts to assume normal position.

In testimony whereof, I affix my signature, in the presence of two witnesses.

GEORGE F. HATCH.

Witnesses:
MARTIN PALESON,
CHAS. HASTINGS.

Copies of this patent may be obtained for five cents each, by addressing the "Commissioner of Patents, Washington, D. C."